(12) United States Patent
Lange et al.

(10) Patent No.: US 6,451,079 B1
(45) Date of Patent: Sep. 17, 2002

(54) POCKET FILTER HAVING INNER FRAMES MOUNTED WITHIN AN OUTER FRAME

(75) Inventors: Michael Lange, Reinfeld; Uwe Westphal, Lübeck, both of (DE)

(73) Assignee: Camfil KG, Reinfeld (DE)

( * ) Notice: Subject to any disclaimer, the term of this patent is extended or adjusted under 35 U.S.C. 154(b) by 0 days.

(21) Appl. No.: 09/621,216

(22) Filed: Jul. 21, 2000

Related U.S. Application Data

(63) Continuation of application No. PCT/EP99/00257, filed on Jan. 18, 1999.

(30) Foreign Application Priority Data

Jan. 23, 1998 (DE) ...................................... 298 01 086U

(51) Int. Cl.⁷ ............................................. B01D 29/17
(52) U.S. Cl. .............................. 55/379; 55/483; 55/484; 55/492; 55/506; 55/508; 55/DIG. 12; 55/DIG. 31
(58) Field of Search .......................... 55/378, 379, 381, 55/382, 483, 484, 492, 506, 508, DIG. 12, DIG. 31

(56) References Cited

U.S. PATENT DOCUMENTS

| | | | |
|---|---|---|---|
| 4,300,927 A | 11/1981 | Day ............................. | 55/378 |
| 4,312,648 A | 1/1982 | Day ............................. | 55/378 |
| 4,356,011 A | 10/1982 | Day et al. ..................... | 55/368 |
| 4,808,203 A | 2/1989 | Sabourin ...................... | 55/492 |
| 4,854,953 A * | 8/1989 | Van Weerden et al. ....... | 55/483 |
| 5,298,044 A | 3/1994 | Sutton et al. ................. | 55/378 |
| 5,695,535 A * | 12/1997 | Hinterlang et al. ........... | 55/379 |

FOREIGN PATENT DOCUMENTS

| | | |
|---|---|---|
| DE | G 87 16 251.2 | 3/1988 |
| DE | G 93 00 732.2 | 5/1993 |
| DE | 44 43 144 C1 | 11/1995 |
| EP | 0 663 228 A1 | 7/1995 |

* cited by examiner

*Primary Examiner*—Robert A. Hopkins
(74) *Attorney, Agent, or Firm*—Synnestvedt & Lechner LLP

(57) ABSTRACT

The pocket filter exhibits an outer frame made of plastics material and several adjacent filter elements arranged in the outer frame. The outer frame is composed of opposing limb profiles, a base profile and a closing profile which each have an essentially U-shaped cross section with an inwardly opened interior space. The profiles can be joined to one another at the corners of the outer frame by corner connectors. An inner frame made of plastics material is arranged inside a free border of each filter pocket. Each inner frame has opposing longitudinal profiles and facing profiles fastened thereon. Each longitudinal profile has holes spaced from one another and projecting parts which extend outward and which cooperate in the open outer frame when the filter elements are pushed in. Transverse walls fastened on the accompanying longitudinal profile extend into an inlet of the inner frame. One of the transverse walls extends at least approximately in alignment with each hole and with each projecting part of the longitudinal profiles.

36 Claims, 11 Drawing Sheets

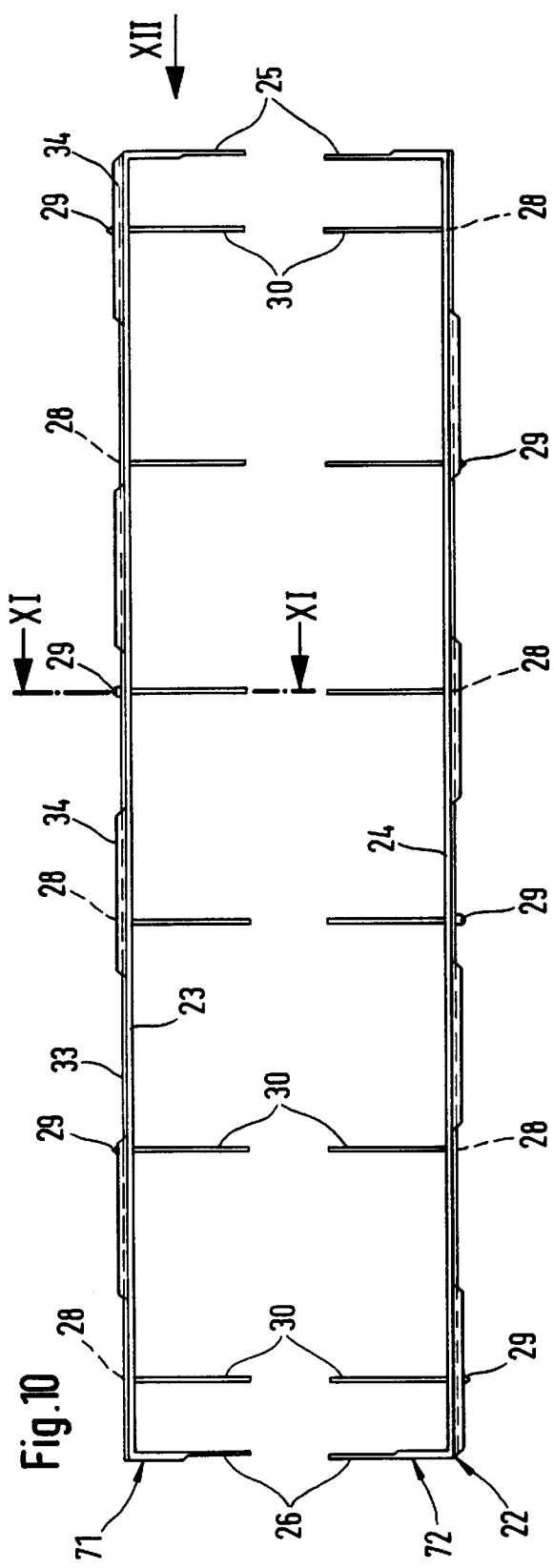
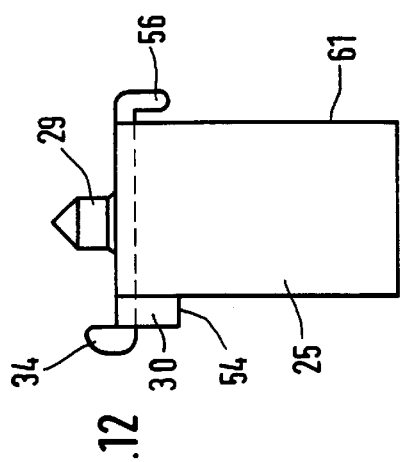
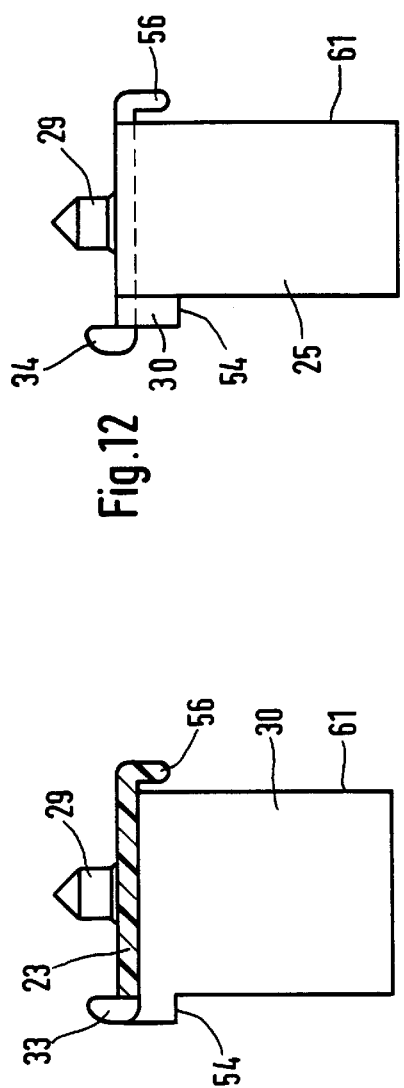

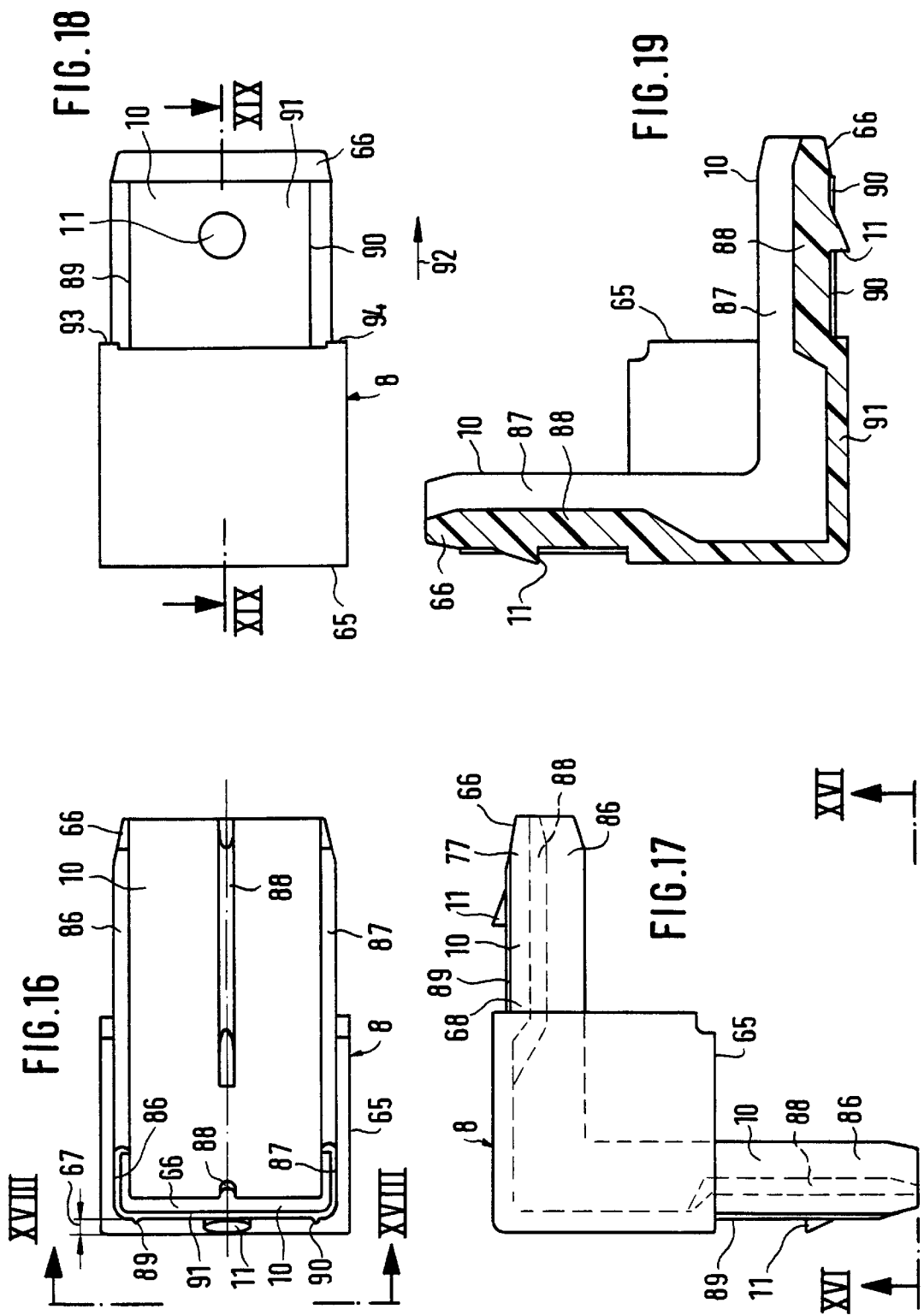

POCKET FILTER HAVING INNER FRAMES MOUNTED WITHIN AN OUTER FRAME

This application is a continuation of International Application PCT/EP99/00257, filed Jan. 18, 1999.

FIELD OF THE INVENTION

The invention relates to a pocket filter having an outer frame made of plastics material and several adjacent filter elements arranged in the outer frame.

BACKGROUND OF THE INVENTION

A known pocket filter of this type disclosed in German patent publication DE 44 43 144 C1 makes use of an outer frame of which the profiles exhibit a U-shaped inwardly opened cross section. At the end of each of the limbs of this cross section, a web extends inwardly at right angles. The clear distance between webs is smaller than the height of the profiles of the inner frame. Each of these profiles is rotated elastically around its longitudinal axis before it can be manipulated with the free border of the pocket into the interior space of the profile of the outer frame. To this end, the deformation resistance of the longitudinal and front profiles of each inner frame must be reduced by means of end notches, which has a disadvantageous effect on the rigidity of the inner frame. Longitudinal profiles of the inner frame are provided with holes and accompanying complementary, projecting parts protruding outwards. Each projecting part penetrates two pocket borders and one aligned hole in the adjacent inner frame and is finally welded to a rivet head. Transverse walls are arranged between the longitudinal profiles and between adjacent protruding parts and holes of each longitudinal profile. The low level of rigidity of the inner frame and the high assembly costs are disadvantageous.

The design of the outer frame in one piece in the form of a grid with a longitudinal opening for each filter pocket is known per se from U.S. Pat. No. 4,300,927 A. Each inner frame is designed as a funnel shape and, at the inlet side, is interlocked by means of teeth with an inner border of the outer frame.

An additional clamping ring presses the free border of the filter pocket against the outer surface of the inner frame.

U.S. Pat. No. 4,312,648 A shows as known per se a one-piece outer frame onto which outer flanges of funnel-shaped inner frames are placed in an overlapping manner. An additional clamping ring is also required here in accordance with U.S. Pat. No. 4,300,927 A.

One-piece inner frames made of plastics material with transverse walls between the longitudinal profiles are known per se from U.S. Pat. No. 5,298,044 A. The transverse walls laterally limit open-passages; in each case, a projecting part is arranged in the longitudinal center of one longitudinal profile, and a hole is arranged in the other longitudinal profile. The free border of two filter pockets in each case is clamped between adjacent inner frames and their projecting part/hole pairings. Each inner frame is supported with a continuous longitudinal flange in a continuous longitudinal groove of the adjacent inner frame. The facing profiles of the inner frame are held with projecting parts and the free borders of the filter pockets in an outer frame of U-shaped cross section.

Bending the outer frame from a metal strip with notches along the border is known per se from German patent publication DE 87 16 251 U1. In this context, overlapping areas with sections of the sheet metal folded at right angles are produced at the corners of the outer frame in order to achieve the most level outer facing surface of the outer frame possible. The outer frame ultimately has a U-shaped cross section.

In the case of a pocket filter known per se and disclosed in German patent publication DE 93 00 732 U1 all the profiles of the outer frame have a purely U-shaped, inwardly open cross section into which extensions of the corner connectors also exhibiting a U-shaped cross-section are adhered. The border of the filter pockets can be held firmly sealed in the interior space of the profiles of the outer frame with a sealing strip made of PU-foam or cellular rubber. This design is not sufficiently stable especially with relatively high pressure differences and larger filter-pocket sizes. The holding and sealing of the filter pockets in the outer frame are unreliable.

Designing all profiles of the outer frame with a U-shaped, inwardly opened cross section is known per se from U.S. Pat. No. 4,356,011 A. In the interior space, a stopping strip projects from approximately half of every limb; on closing the outer frame, the said stopping strips are placed against the free border of the filter pocket. This free border is inserted together with a bar of the inner frame into the outer frame. Longitudinal bars of adjacent inner frames are attached to one another by rivets with pocket borders clamped between them.

SUMMARY AND OBJECTS OF THE INVENTION

The present invention is based on the object of designing the inner frame to be more stable, and simplifying and improving the installation of the filter elements into the outer frame.

This object is resolved by a pocket filter according to the invention having an outer frame made of plastics material and several adjacent filter elements arranged in the outer frame. The outer frame is composed of opposing limb profiles, a base profile and a closing profile, each of which have an essentially U-shaped cross section with an inwardly opened interior space. Each of these elements can be joined to one another at the corners of the outer frame, wherein each profile of the outer frame exhibits a base wall and limbs extending from the base wall. Holding ribs extend from the free end of each limb and are spaced at a clear distance from one another.

An inner frame made of plastics material of the accompanying filter element is arranged within a free border of each filter pocket. Each inner frame exhibits two opposing longitudinal profiles and two opposing end profiles attached at the ends of the longitudinal profiles.

In a transverse plane of each inner frame at least two holes are spaced from one another and at least two, outwardly extending, complementary projecting parts are arranged alternately in each longitudinal profile, whereby each hole in one longitudinal profile is opposed by a projecting part in the other longitudinal profile. Transverse walls are fastened on the accompanying longitudinal profile and extend into an inlet of the inner frame. Each projecting part of the inner frame penetrates the free border of the accompanying filter pocket and the free border of an adjacent filter pocket and engages into the complementary hole of the inner frame belonging to the adjacent filter pocket. Each filter element engages with the free border of its filter pocket in a sealed manner into the interior space of the adjacent profiles of the outer frame, and one of the transverse walls extends at least approximately in alignment with each hole and each projecting part of the longitudinal profiles of each inner frame.

The pocket filter is especially intended for filtering air and other gases. All the profiles of the outer frame are preferably made of extruded plastics material, for example, highly impact-resistant polystyrene or other plastics materials capable of incineration. The inner frame can be readily manufactured and connected in a form-locking manner with the free border of the accompanying filter pocket. The transverse walls form a desirable stiffening of the inner frame and, moreover, define lines of action for the assembly forces which will have to be applied in order to fit the filter elements into the outer frame. The penetration of the projecting parts through the free border of the filter pocket is also made easier. Additionally, the free ends of each of the projecting parts can be pointed. Fitting together the projecting part and the hole produces an additional mutual stiffening of the joint between adjacent filter elements. The holes and projecting parts are preferably spaced from one another at the same distance.

Inner frames designed in one piece can be manufactured in a particularly cost-favorable and robust manner.

Each inner frame can be designed in two parts so that the transverse walls and the end profiles of both parts of the inner frame overlap and so that the mutually overlapping transverse walls and end profiles are attached to one another respectively in the region of overlap. This provides the advantage of being able to produce different required overall widths of the inner frame. Mutually overlapping transverse walls and front profiles can be fastened, for example, with staples, by gluing or by welding.

The design and interlocking teeth of the outer flange sections of one inner frame with notches of the adjacent inner frame such that each longitudinal profile of the inner frame exhibits at an inlet side of the inner frame an outer flange projecting outwards and periodically interrupted by a notch lead to a further mutual stiffening of the joint between adjacent filter elements. Furthermore, each outer flange section of an inner frame can engage in a notch of an adjacent inner frame, and on each inner frame, each outer flange section of one longitudinal profile is opposed by a notch of the other longitudinal profile.

An underside of each outer flange acts as a stop for the free border of the associated filter pocket (20) to effect a defined positioning of the filter pocket relative to the accompanying inner frame before the projecting parts of the inner frame penetrate the free border of the filter pocket creating a form-fit joint.

Each longitudinal profile of the inner frame may exhibit an inwardly extending inner flange at an outlet side of the inner frame. This increases the rigidity of the inner frame and leads to a desired turbulence in the flowing medium which is to be cleaned. In this manner, erosion of the filter pocket downstream of the inner frame is prevented.

Each holding rib extends from its limb in the direction of the base wall and are similar to barbs and co-operate particularly well with the filter elements.

At least one opposing surface of the profile can be arranged at a distance from the free end of each holding rib in the interior space, and this is favorable with respect to flow technology and leads to a good fastening and sealing of the filter elements in respect of the outer frame. For instance, each opposing surface can, on the one hand, be attached to the accompanying limb and, on the other hand, may be supported by a support web on the base or on an intermediate wall of each profile of the outer frame wherein the said intermediate wall defines the longitudinal channel. As a result, the profiles of the outer frame also gain additional rigidity even with a small wall thickness.

The filter element can be arranged respectively at the base profile and at the closing profile of the outer frame and exhibits an outer longitudinal profile facing the base profile or the closing profile to ensure that the filter element is held reliably in the outer frame. The holding ribs of the outer frame lock and hold their outer longitudinal profile in the optimum operating position.

This effect is also achievable with a shoulder of each transverse wall cooperating with free ends of the holding ribs in order to position and lock the filter element in place.

A wall of the filter pocket can be guided as if through a chicane and compressed between free ends of the inner flange and the opposing holding rib to ensure that a reliable holding of the filter pocket in the frame system is achieved and, additionally, in most cases, the filter pocket is adequately sealed in respect of the frame system.

If required, the free border of each filter pocket can be adhered to an outer surface of the accompanying inner frame to enhance the safety of the seal.

To also serve this purpose the filter pocket can be adhered both to the inner flange and also to the opposing limb and its holding rib (19).

Each filter element can be pushed into the limb profile of the outer frame in a simple manner such that each end profile and at least those regions of the longitudinal profiles of each inner frame which project into the intermediate space of the limb profiles of the outer frame exhibit a height which is somewhat smaller than the clear distance between the holding ribs of the limb profiles of the outer frame.

The filter pocket is generally already well sealed in respect of the frame system because the free border of each filter pocket is pressed by the two end profiles of the inner frame against the at least one opposing surface of the two limb profiles of the outer frame.

If required, this seal can be further improved if the free border of each filter pocket is adhered to the at least one opposing surface.

Further improvements to the holding and sealing of the filter pocket relative to the frame system may be realized if a wall of each filter pocket is guided as if through a chicane and compressed between lower edges of the longitudinal profiles of the inner frame and the opposing holding ribs of the limb profiles of the outer frame.

This effect can be further improved if each filter pocket is adhered to the opposing limb of the two limb profiles and also adhered to the holding rib of the limb.

The special type of corner connectors and their co-operation with the adjacent profiles of the outer frame allows the individual profiles of the outer frame to be connected to one another very easily, reliably and in a dimensionally stable manner. To that end a longitudinal channel is formed in the interior space of each of the profiles of the outer frame such that a tongue of an accompanying corner connector can be introduced from each facing side of the profile into the longitudinal channel of each profile so that each tongue exhibits a locking pin which snaps into a locking aperture in a wall of the longitudinal channel to achieve a form-fit locking of the corner connector and the profile. Initially only the two limb profiles are plugged into the base profile, thereby producing a U-shaped outer frame. The filter elements are then successively inserted into this. Finally, after the last filter element, the closing profile is connected via its two corner connectors to the adjacent limb profiles of the outer frame to form a complete, rigid outer frame. A relatively narrow fit which promotes stability may be established between the tongue of each corner connector and the accompanying longitudinal channel in the adjacent profile.

Each tongue may exhibit a transverse slot extending from its free end beyond the locking pin, and thus a form-fit locking of each corner connected to the adjacent profiles is achieved. This again increases the strength and rigidity of the overall outer frame. This form-fit locking is releasable. To this end, the part of the tongue which bears the locking pin can be pressed in elastically with a tool, for example, a screw-driver, until the locking pin has left the locking aperture. The corner connectors and profile are then separated.

A form-fit, releasable connection is achieved between the corner connector and the adjacent profiles if each tongue exhibits on each side of the locking pin a longitudinal slot extending from the free end of the tongue (10) to beyond the locking pin such that between the longitudinal slots a resilient lever bearing the locking pin is defined, and that the lever exhibits a recess in its side facing away from the locking pin for reducing its thickness by comparison with the thickness of the tongue.

By increasing the height of each locking pin in the direction towards a foot of the tongue production of the snap-connection is simplified. The height of the locking pin, for example, may start from zero. This results in a wedge-like design of locking pin which, when the corner connector and adjacent profile are pressed together, leads to a resilient deflection of the outer part of the tongue.

The longitudinal channel can be arranged adjacent to a base wall of the profile and support walls of the opposing surfaces are supported on an intermediate wall which defines the longitudinal channel. This leads to a particularly rigidly connected longitudinal channel and a correspondingly rigid outer frame altogether.

When the longitudinal channel is arranged adjacent to a base wall of the profile, and an intermediate wall opposing the base wall is corrugated in cross section such that a corrugation peak of the intermediate wall accommodates free ends of the adjacent projecting parts in a notch, and corrugation troughs of the intermediate wall are interspaced at a distance from one another define the opposing surfaces then a simplification in the manufacture of the profiles is achieved with adequate or even increased stability of the profiles.

Opposing guide-ribs of the profiles which guide the tongues project into the interior space of the profiles to facilitate the movement of the tongues in the interior spaces. The guide ribs are preferably arranged parallel to the direction of introduction of the tongues.

Each tongue may exhibit a substantially U-shaped cross section with a base and with side walls projecting inwardly from the base in order that an additional stiffening of the tongues is achieved.

A stiffening rib can extend from the base of each tongue in its longitudinal direction to achieve the same goal.

Gliding ribs which are spaced from one another and can be supported on a base wall of the profile can extend from each tongue and simplify and improve the movement of the tongue in the interior space of the profiles. The gliding ribs are preferably arranged parallel to the direction of introduction of the tongues.

The corner connector can exhibit a base element which bears the tongues and the base element exhibits lateral locating ribs which project in the direction of the profile and are intended for positioning on the accompanying profile to achieve a better seal of the base element in respect of the profiles of the outer frame.

Each projecting part can form a press-fit with the accompanying hole of the adjacent inner frame to achieve an additional stiffening of the joint between adjacent inner frames.

These and other features and advantages of the invention are explained in greater detail with reference to the embodiments shown in the drawings.

BRIEF DESCRIPTION OF THE DRAWINGS

FIG. 10 shows a plan view of a two-piece inner frame, FIG. 11 shows a section in accordance with line XI—XI in FIG. 10 in an enlarged view, FIG. 12 shows an enlarged view in accordance with arrow XII in FIG. 10, FIG. 16 shows the view in accordance with the line XVI—XVI in FIG. 17 of another embodiment of the corner connector, FIG. 17 shows the plan view of a corner connector in accordance with FIG. 16, FIG. 18 shows the side view in accordance with the line XVIII—XVIII in FIG. 16, FIG. 19 shows the sectional view in accordance with the line XIX—XIX in FIG. 18 and FIG. 20 shows a side view corresponding to FIG. 14 with the tongue of the corner connector pushed in.

DETAILED DESCRIPTION OF PREFERRED EMBODIMENTS

Figure 1:
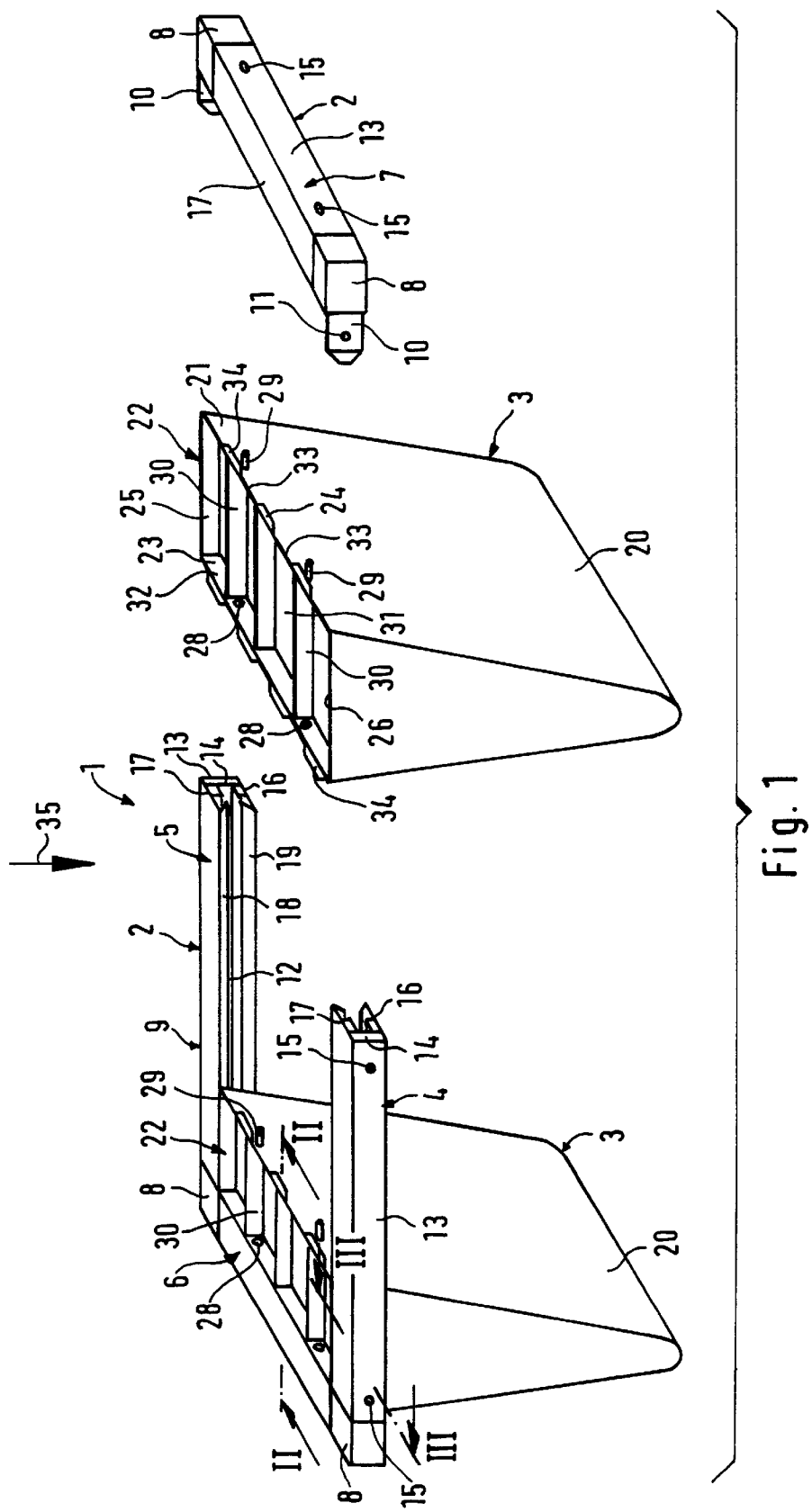
FIG. 1 shows a perspective schematic view of the outer frame and two filter elements.

FIG. 1 shows a pocket filter 1 with an outer frame 2 made of plastic and filter elements 3 which are disposed adjacent to each other in the outer frame 2.

The outer frame 2 exhibits opposing limb profiles 4 and 5, a base profile 6 and a closing profile 7. In the assembly condition in accordance with FIG. 1, the limb profiles 4, 5 are each firmly connected by one corner connector 8 with the base profile 6 to form a U-shaped part 9 of the outer frame 2.

Each corner connector 8 exhibits two tongues 10 at right angles to one another protruding from a base element of the corner connector 8. Each tongue 10 bears on its outer side a locking pin 11.

The profiles 4 to 7 all exhibit the same cross sectional design and are preferably extruded from an appropriate plastics material. In this manner, the profiles 4 to 7 can be cut to the length required in each case and connected with the corner connectors 8 to form an outer frame of the desired size. Each profile, 4 to 7 exhibits an essentially U-shaped cross section with an inwardly opened interior space 12. A longitudinal channel 14 is formed in each interior space 12, adjoining a base wall 13 of the profile 4 to 7. The tongue 10 of the associated corner connector is introduced into the longitudinal channel 14 of each profile 4 to 7 from each end of the profile 4 to 7, until the end of the profile 4 to 7 comes into contact with the base element of the relevant corner connector 8. At this moment, the locking pin 11 snaps into a locking aperture 15 provided in the base wall 13 thereby securing the plug-in connection consisting of profile 4 to 7 on the one side and corner connector 8 on the other side. The base wall 13 may yield elastically in response to the locking pin 11. Alternatively, in accordance with FIGS. 4 and 6, the tongue 10 may be provided with a transverse slot 73 thereby forming an outer part 74, which is itself resilient, of the tongue 10. Also in accordance with FIGS. 4 and 6, the tongue 10 may exhibit longitudinal slots 75 and 76 on each side of the locking pin 11, the said slots defining between them a resilient lever 77 which bears the locking pin 11. The lever 77 exhibits a recess 78 on its inner side to reduce its thickness.

Each profile 4 to 7 of the outer frame 2 exhibits limbs 16 and 17 extending from the base wall. A holding rib 18 and 19 extends in the manner of a barb from the free end of each limb 16, 17 in the direction of the base wall.

Each filter element 3 exhibits a filter pocket 20 made from a filter medium known per se. An inner frame, which has preferably been manufactured using the injection molding technique and which, in the case of FIG. 1, is made in one piece, is inserted into the free border 21 of each filter pocket 20. The inner frame 22 exhibits two opposing longitudinal profiles 23 and 24 and two opposing end profiles 25 and 26 attached to the ends of the longitudinal profiles 23, 24.

In a transverse plane 27 (FIG. 9) of each inner frame, holes 28 spaced from one another are provided in each longitudinal profile 23, 24 and projecting parts 29 complementary to the holes 28 and extending outwards are arranged alternately. Opposing each hole 28 in the one longitudinal profile 23, there is a projecting part 29 in the other longitudinal profile 24. Approximately in alignment with each hole 28 and each projecting part 29, a transverse wall 30 attached to the accompanying longitudinal profile 23, 24 extends into an inlet aperture 31 of the inner frame 22. Each projecting part 29 penetrates the free border 21 of the associated filter pocket and also, if the filter element 3 on the right hand side in FIG. 1 is similarly pushed into the U-shaped part 9 of the outer frame 2, penetrates the free border 21 of the then adjacent filter pocket 20, before the projecting part penetrates into the complementary hole 28 of the inner frame 22 associated with the adjacent filter pocket 20. As a result of this mutual "pinning" of adjacent inner frames 22, the accompanying filter pockets 20 are, on the one hand, fixed at their free border 21 and clamped to form a seal and, on the other hand, the stability of the joint between adjacent inner frames is promoted.

Each longitudinal profile 23, 24 of the inner frame 22 exhibits at an inlet side 32 of the inner frame 22 an outwardly projecting outer flange 34 periodically interrupted by a notch 33. When filter elements 3 have been pushed together, each outer flange section 34 of an inner frame 22 engages in a notch 33 of an adjacent inner frame 22.

In each inner frame 22, every outer flange section 34 of a longitudinal profile 23 is opposed by a notch 33 of the other longitudinal profile 24. In the case of filter elements 3 pushed together in the outer frame 2, the mutually interlocking outer flange sections 34 and notches 33 lead to a further increase in the stability of the joint between filter elements 3 and ultimately with the outer frame 2.

After the last filter element 3 has been pushed into the U-shaped part 9 of the outer frame 2, the closing profile 7, which according to FIG. 1 is already provided with two corner connectors 8, is introduced with the free tongues 10 of its corner connectors 8 into the longitudinal channels 14 of the limb profiles 4, 5 and is locked there with the locking pins 11 into the locking apertures 15. The complete pocket filter is thereby fully assembled and ready for use.

The direction of flow 35 of the medium to be filtered is shown in FIG. 1.

Figure 2:
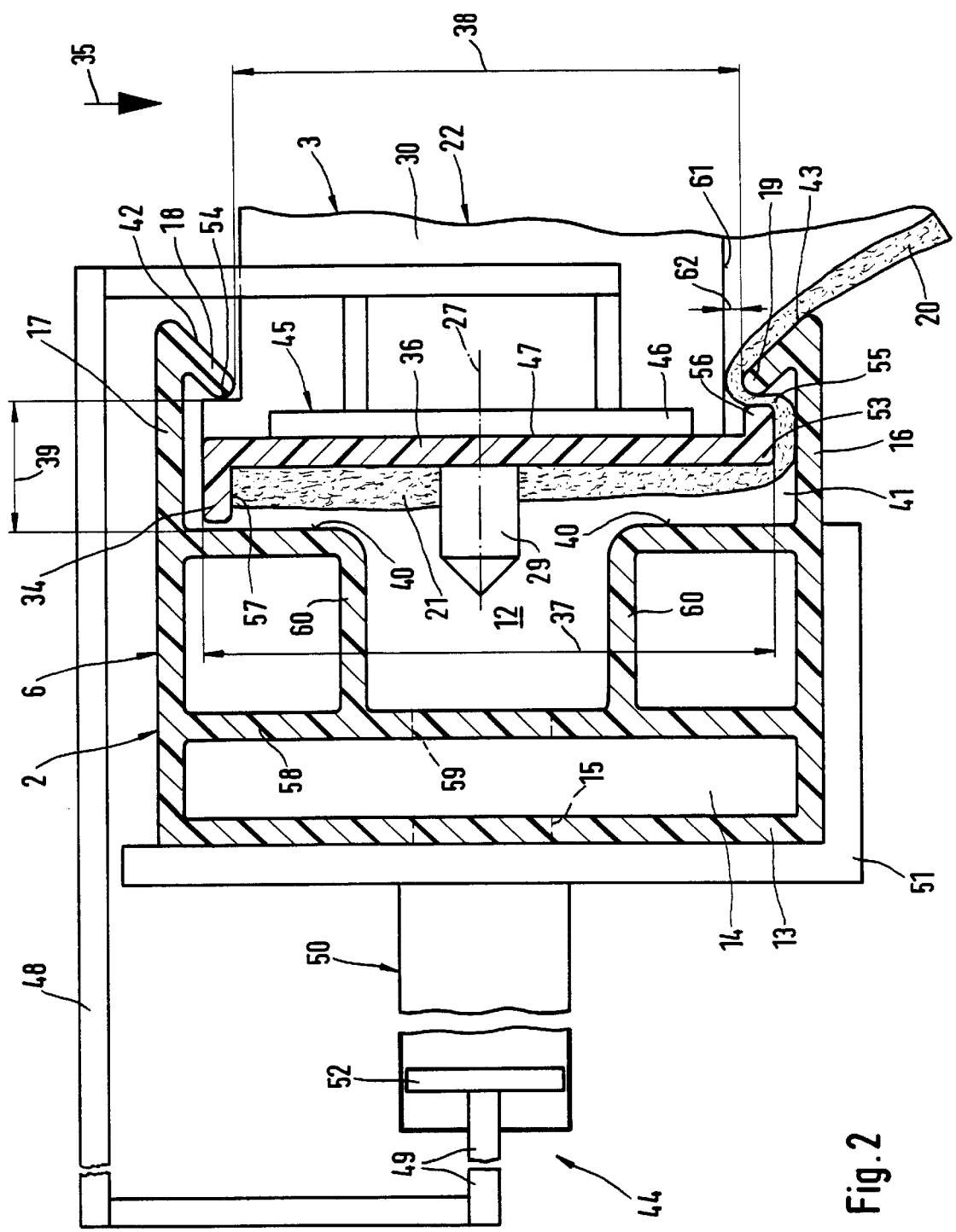
FIG. 2 shows the cross-sectional view in accordance with line II—II in FIG. 1 in an enlarged view with a schematic drawing of the installation device.

In accordance with FIG. 2, the filter element 3 arranged on the base profile 6 exhibits an outer longitudinal profile 36 facing towards the base profile 6. The outer longitudinal profile 36 has a height 37 which is greater than a clear distance 38 between the holding ribs 18, 19 of the base profile 6.

At a distance 39 from the free end of each holding rib 18, 19, an opposing surface 40 of the profile 4 to 7 is arranged in the interior space 12 of each profile 4 to 7. With all profiles 4 to 7, the free border 21 of at least one of the filter elements 3 is accommodated in an intermediate space 41 defined by the distance 39.

In the case of FIG. 2, in this same manner, only the free border 21 of that filter element is accommodated which exhibits the outer longitudinal profile 36. This occurs as follows:

The filter element on the left in FIG. 1, that is, the first filter element, is introduced into the right, free end of the U-shaped part 9 of the outer frame 2 (cf. FIG. 3) and is pushed to the left into the limb profile 4, 5 until the outer longitudinal profile 36 stops against the outer oblique surfaces 42 and 43 of the holding ribs 18, 19. At the latest, from this point in time onwards, an assembly tool 44, which is shown only schematically in FIG. 2, can be used. The assembly tool 44 exhibits a rake-like pressing element 45, which is guided with one pressing shoe 46 between each of the adjacent transverse walls 30 into contact with a rear side 47 of the outer longitudinal profile 36. The pressing element 45 is attached to a C-shaped actuation frame 48, which, in turn, is attached to a piston rod 49 of a double-action piston cylinder unit 50. The piston cylinder unit 50 is attached to the outer side of a holding bracket 51 on the opposing side of which the base wall 13 is supported.

If the right-hand side in FIG. 2 of piston 52 is now filled with pressurized fluid, the actuation frame 48 and with it the pressing element 45 will be drawn to the left. As a result, the outer flange sections 34 at the top and the free border 21 of the filter pocket 20 at the bottom with one lower border 53 of the outer longitudinal profile 36 are pressed against the outer oblique surfaces 42, 43. This results in the holding ribs 18, 19 together with the limbs 16, 17 being rotated elastically outwards until the outer longitudinal profile 36 with the free border 21 of the filter pocket 20 has entered the intermediate space 41. Then the limbs 16, 17 with their holding ribs 18, 19 spring back into the starting position shown in FIG. 2, wherein the holding rib 18 moves into a positioning and locking position behind a shoulder 54 of each transverse wall 30. In accordance with FIG. 2, a wall 55 of the filter pocket 20 is guided in the manner of a chicane and compressed between free ends of an inner flange 56 on the lower border 53 and the opposing holding rib 19. Furthermore, as a result of the differential pressure from the flowing medium to be filtered, the wall of the filter pocket 20 is held firmly against the outer oblique surface 43 of the holding rib 19. These measures alone generally lead to an adequate sealing of the filter pocket from the base profile 6. If required, the free border 21 of the filter pocket 20 can be adhered to the outer longitudinal profile 36 or the entire outer surface of the inner frame 22. Adhesive may be applied either alternatively or additionally between the wall 55, on the one side, and the limb 16 and/or the holding rib 19, on the other side.

An underside 57 of each outer flange section 34 acts as a stop for the free border 21 of the accompanying filter pocket 20 when the inner frame 22 is initially introduced into this free border 21 and before the projecting parts 29 are pressed through the free border 21.

FIG. 2 illustrates that the longitudinal channel 14 is also limited by an intermediate wall 58 parallel to the base wall. For reasons of production technology, an opening 59 is provided in the intermediate wall 58 in axial alignment with each locking aperture 15. In this manner, the locking aperture can be simply produced by additionally punching through the intermediate wall 58 in the form of an opening 59. Each of the counter surfaces 40 are supported via a supporting wall 60 on the intermediate wall 58. In this manner, two additional, closed profiles of approximately square cross sectional area, which contribute considerably to the stiffening of the profiles 4 to 7, are formed in the interior space 12. In the assembled situation shown in FIG. 2, a lower edge 61 of each transverse wall 30 is located at a slight distance 62 from an upper edge of the holding rib 19. The lower edges 61 are located on the wall 55 of the filter pocket 20 and in this manner determine the positional height of the filter element 3 relative to the outer frame 2.

The relationships described in connection with FIG. 2 apply similarly to the co-operation of the closing profile 7 (FIG. 1) with a final filter element 3, which was pushed finally into the U-shaped part 9 of the outer frame 2. In this case, the pressing body 45 of the assembly device 44 is placed against the base wall 13 of the closing profile 7 and presses this against the opposing, outer longitudinal profile 36 of the accompanying filter element 3, until this outer longitudinal profile 36 snaps into the accompanying intermediate space 41 of the closing profile 7 and, at the same time, the locking pins 11 of the corner connector 8 engage with the locking apertures 15 of the limb profiles 4, 5.

Figure 3:
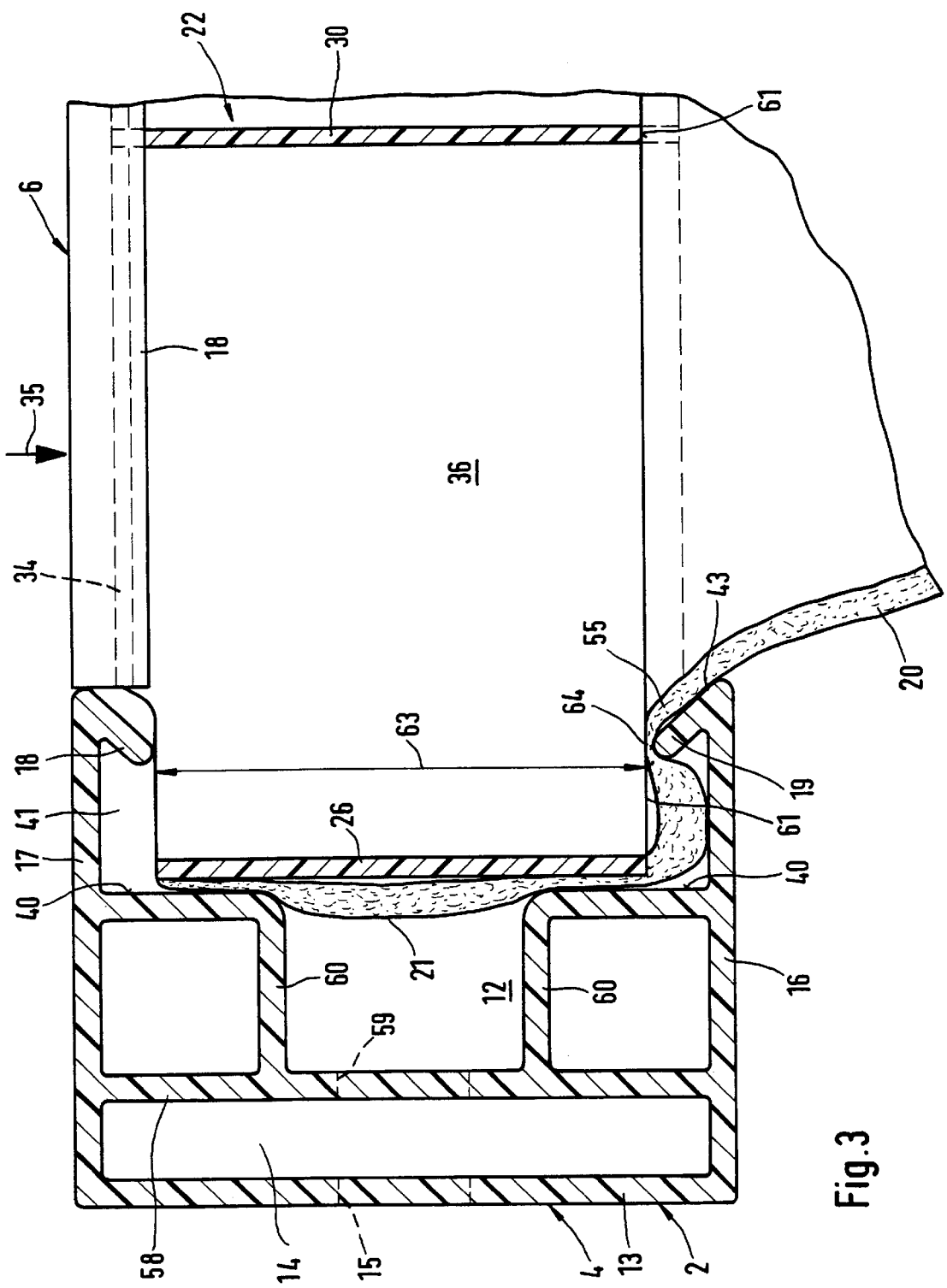
FIG. 3 shows the cross-sectional view in accordance with line III—III in FIG. 1 in an enlarged view.

With the example of the limb profile 4, FIG. 3 illustrates the relationships in the assembled condition. These relationships also apply in mirrorimage reflection for the limb profile 5 (FIG. 1) which is not shown.

The end profile 26 and at least the regions of the longitudinal profiles 23, 24, 36 of each inner frame 22 which penetrate into the intermediate space 41 of the limb profile 4 exhibit a height 63 which is somewhat smaller than the clear distance 38 (cf. FIG. 2) between the holding ribs 18, 19 of the limb profile 4. In this manner, the end profile 26 with the free border 21 of the filter pocket 20 placed outwardly thereon and also the wall 55 of the filter pocket 20 adjoining the free border 21 can readily be pushed into the intermediate space 41 in an axial manner and can be pushed inside the intermediate space 41 up to the end position. At the same time, wall 55 of the filter pocket 20 is guided in the manner of a chicane and compressed between the lower edges 61 of the longitudinal profiles 23, 24, 36 of the inner frame 22 and the opposing holding rib 19 of the outer frame 2, as shown in FIG. 3 at the compression point 64. The wall 55 can be adhered to the holding rib 19, including its outer oblique surface 43, and the inner surface of the limb 16, in order to improve the sealing effect.

The free border 21 of the filter pocket 20 is pressed by the end profile 26 of the inner frame 22 against the opposing surfaces 40 of the limb profile 4 of the outer frame 2. Normally, this in itself achieves an adequate seal between the inner frame 22 and the outer frame 2 also in the region of the limb profiles 4, 5. By way of assistance, the free border 21 may additionally be adhered to the end profiles 25, 26 and/or the opposing surfaces 40.

Figure 4:
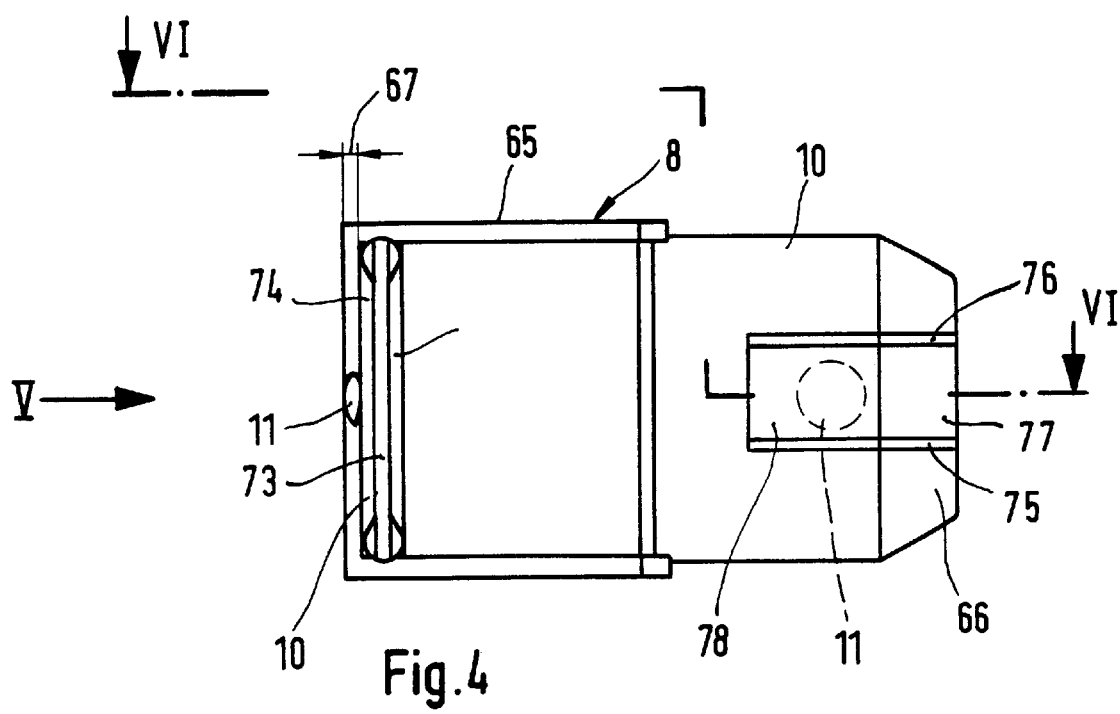
FIG. 4 shows a side view of a corner connector in accordance with FIG. 1 in an enlarged view.

FIG. 4 shows one of the end connectors 8. It exhibits a cuboid but hollow base element 65 out of which the tongues 10 extend at right angles. The free end of each tongue 10 is provided with a cutting edge 66, which facilitates the introduction of the tongue 10 into the associated longitudinal channel 14 (FIG. 1). The locking pin 11 of each tongue 10 is of circular cross section. Each tongue 10 is set back from the associated outer surface of the basic element 65 by a distance 67. The distance 67 corresponds to the thickness of the base wall 13 of the profiles 4 to 7 (cf., for example, FIG. 2). The left-hand tongue 10 shown in FIG. 4 exhibits the transverse slot 73 and the resilient outer part 74. The right-hand tongue 10 in FIG. 4 is provided with the longitudinal slots 75, 76, the resilient lever 77 and the recess 78 of the lever 77.

Figure 5:
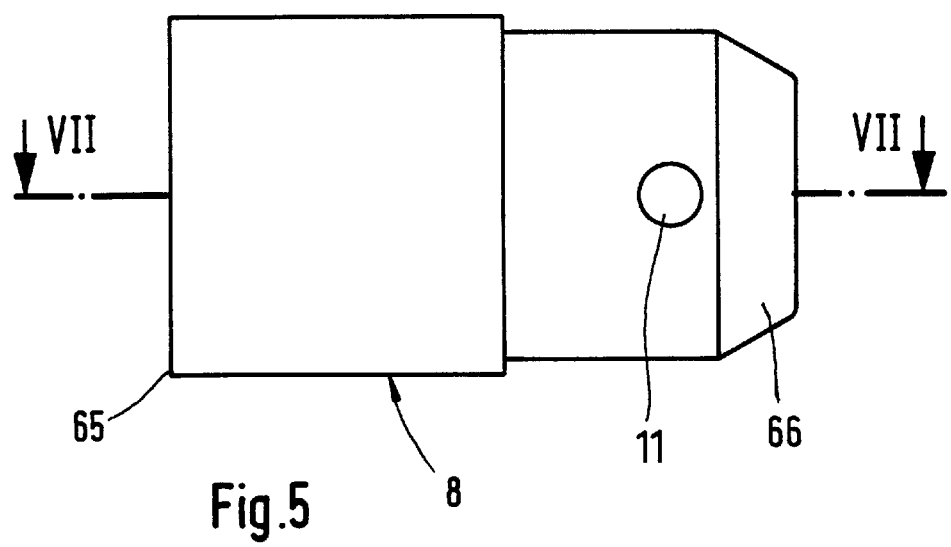
FIG. 5 shows the view corresponding to arrow V in FIG. 4 in respect of another embodiment of the corner connector.
Figure 6:
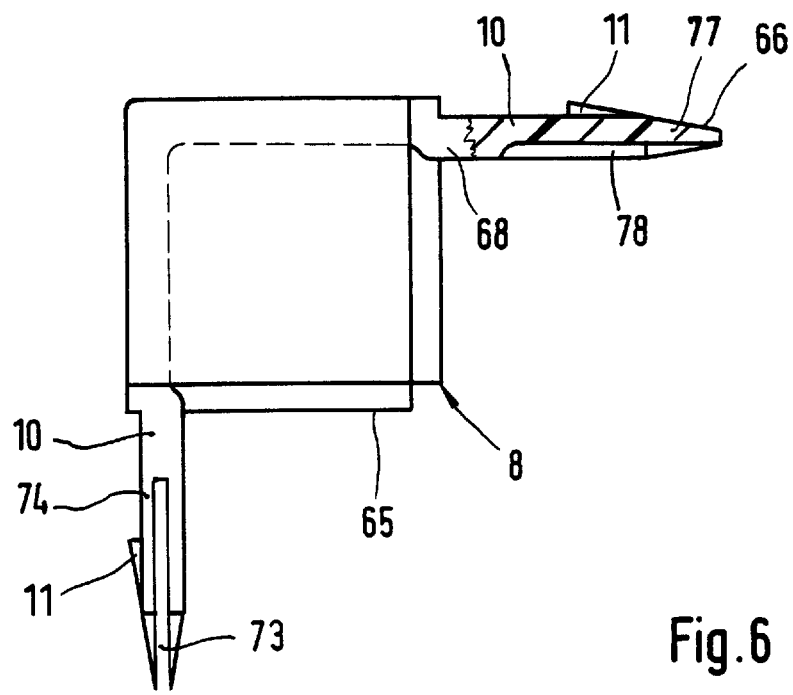
FIG. 6 shows a partial section in accordance with line VI—VI in FIG. 4.
Figure 7:
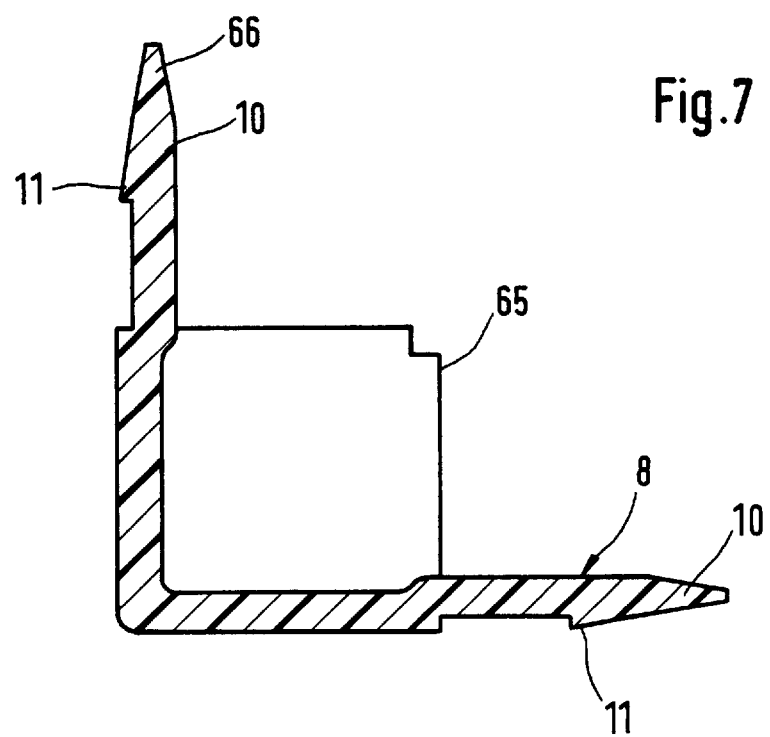
FIG. 7 shows the sectional view in accordance with line VII—VII in FIG. 5.

FIGS. 5 to 7 show further details of the corner connector 8 in different views.

The height of each locking pin 11 increases steadily in accordance with FIG. 6 from zero to a foot 68 of the tongue 10. At the outside of each locking pin 11, this forms a sloping plane which facilitates the pressing of the tongue 10 into the longitudinal channel 14 (FIG. 1). As mentioned above, each locking pin 11 finally snaps into the associated locking aperture 15 in the base wall 13. The lower tongue 10 in FIG. 6 shows, by way of an example, the transverse slot 73 and the resilient outer part 74, while the upper tongue 10 illustrates the lever 77 and its recess 78.

Figure 8:
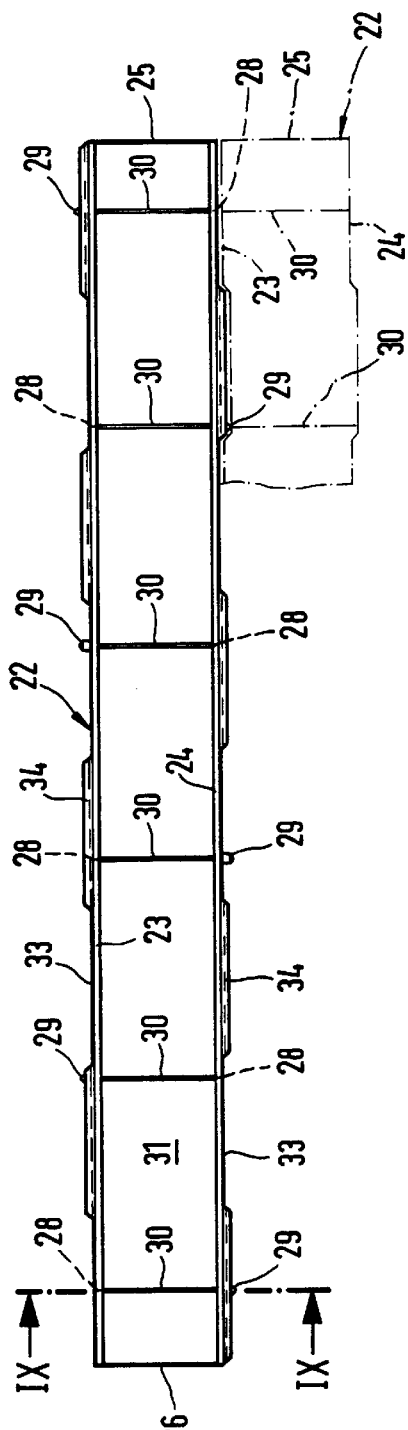
FIG. 8 shows a plan view of a one-piece inner frame.

FIG. 8 shows the plan view of a one-piece inner frame 22 in fully drawn lines; one part of a further, similar inner frame 22 coupled with it is shown in dotted lines. Along each of the longitudinal profiles 23, 24, the alternating sequence, the notches 33, the outer flange sections 34, the holes 28 and projecting parts 29 can be recognized. In the inlet 31 of the inner frame 22, each of the transverse walls 30 is arranged this time in exact alignment with one hole 28 in one of the longitudinal profiles 23, 24 and a projecting part 29 in the other one of the longitudinal profiles 24, 23. Each outer flange section 34 of the one inner frame 22 engages in the complementary notch 33 on the adjacent inner frame 22. To simplify the representation, the free borders of the accompanying filter pockets have been omitted from FIG. 8.

Figure 9:
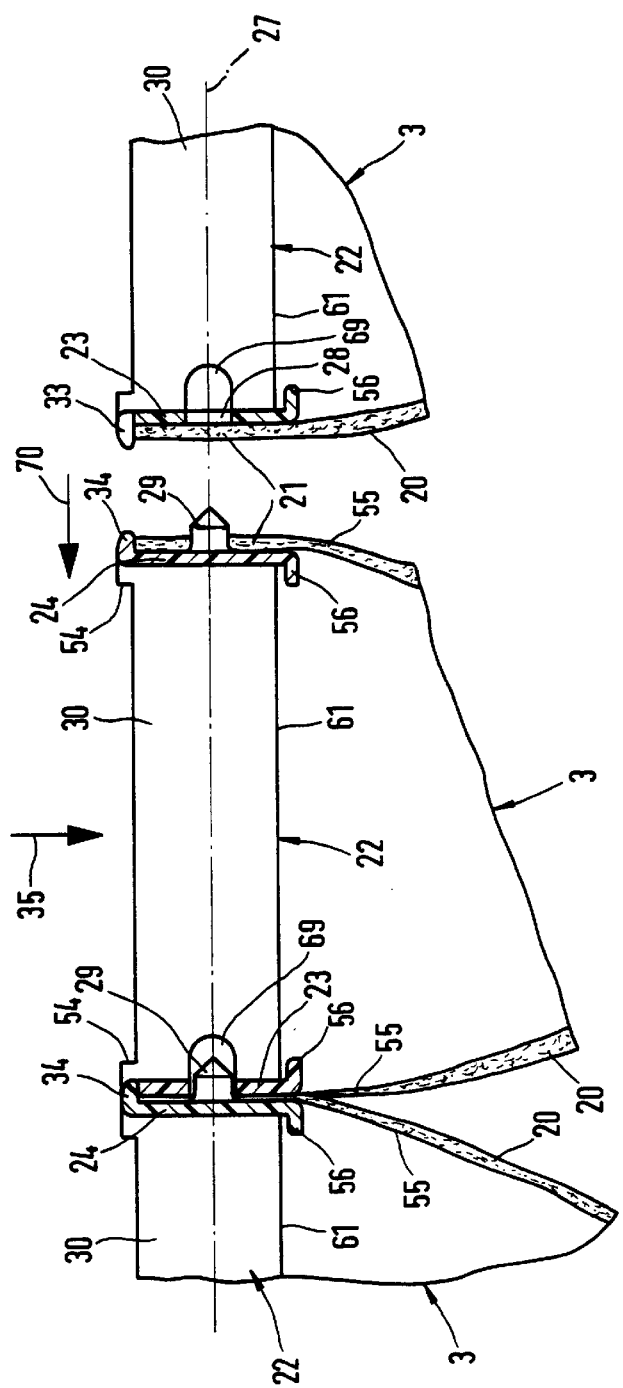
FIG. 9 shows a sectional view in accordance with line IX—IX in FIG. 8 through several adjacent filter elements with inner frames.

However, the filter pockets 20 and their free borders 21 are shown clearly in FIG. 9 in their cooperation with the inner frames 22. On the left in FIG. 9, two inner frames 22, 22 are shown in the mutually compressed operating position, in which the free borders 21 of both filter pockets 20 are compressed between adjacent longitudinal profiles 23, 24. The projecting part 29 is pointed at its free end and has penetrated the free borders 21. In the range of movement of each projecting part 29, behind the associated hole 28 of the adjacent longitudinal profile 23, a notch 69 is formed in each case in the adjacent transverse wall 30. The right-hand filter element shown in FIG. 9 is being moved in the direction of an arrow 70 towards the center filter element 3. In this manner, the parts in the region of the coupling can be clearly recognized.

In all of the Figs. of the drawings, the same parts are marked with the same reference numbers.

FIGS. 10 to 12 represent an alternative, two-piece inner frame 22 of which both parts 71 and 72 are preferably designed in an identical manner. As shown in FIG. 10, shared facing profiles 25, 26 and shared transverse walls 30 of parts 71, 72 are turned to oppose one another and then pushed so far together until the desired width of inner frame 22 for the relevant application is achieved. However, in this condition, the free ends of the facing profiles 25, 26 and of the transverse walls 30 of the two parts 71, 72 overlap to a greater or lesser extent. A mutual connection between each of the accompanying free ends takes place in the overlapping area. This can be achieved, for example, by stapling with staples, by gluing or welding, for example, by ultrasonic welding. In this manner, inner frames 22 of different widths can be produced from one set of parts 71, 72.

Figure 13:
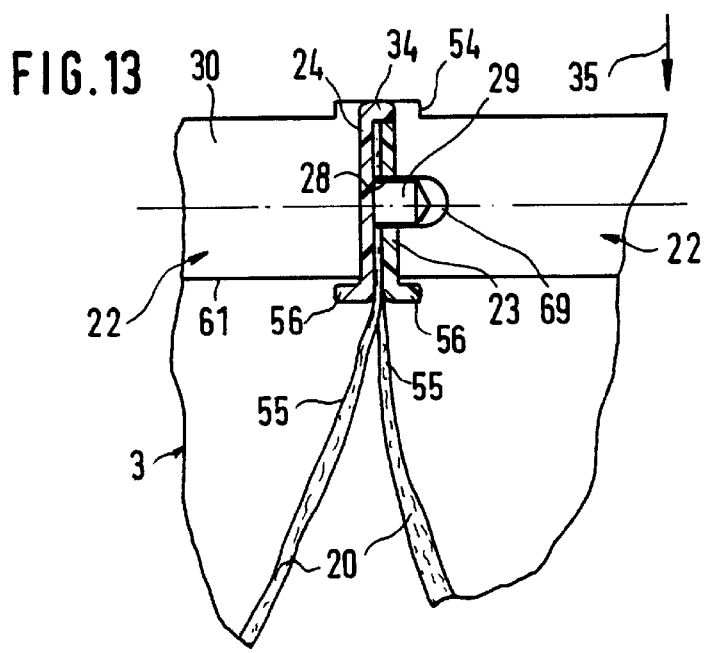
FIG. 13 shows a detail from FIG. 9 with a press-fit in the connection area.

In accordance with FIG. 13, the projecting parts 29 are arranged with a press-fit in the holes 28 and possibly in the notches 69. This increases the rigidity of the inner frames 22, 22 pressed against each other which accommodate the two walls 55, 55 between them.

Figure 14:
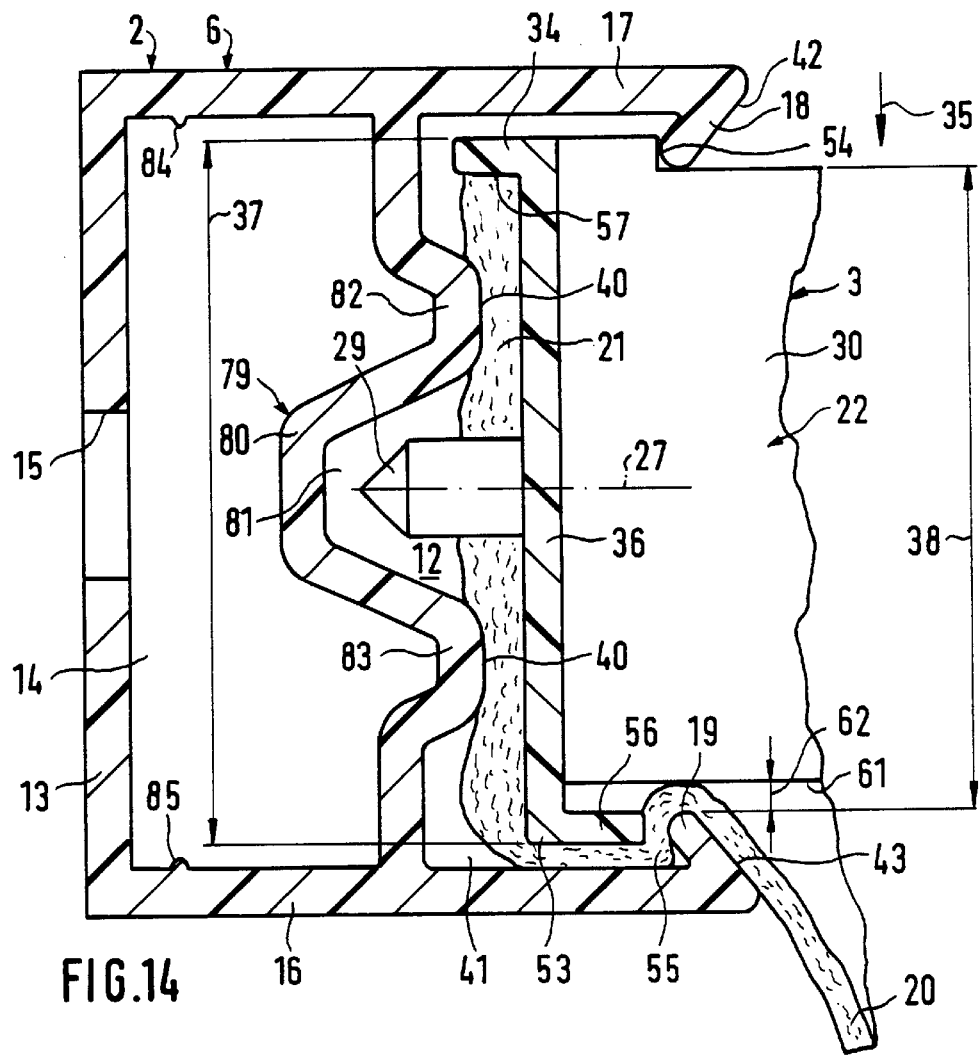
FIG. 14 shows a sectional view corresponding to that of FIG. 2 with another embodiment of the profiles of the outer frame.

In accordance with FIG. 14, one of the intermediate walls 79 opposing the base wall 13 is corrugated. A corrugation peak 80 of the intermediate wall 79 accommodates free ends of the adjacent projecting parts 29 with a notch 81. Corrugation troughs 82, 83 of the intermediate wall 79 arranged at a distance from each other define the opposing surfaces 40, 40. In the case of FIG. 14, by contrast with FIG. 2, the free border 21 of the filter pocket 20 is also compressed between the outer longitudinal profile 36 of the inner frame 22 and the opposing surfaces 40, 40.

Figure 15:
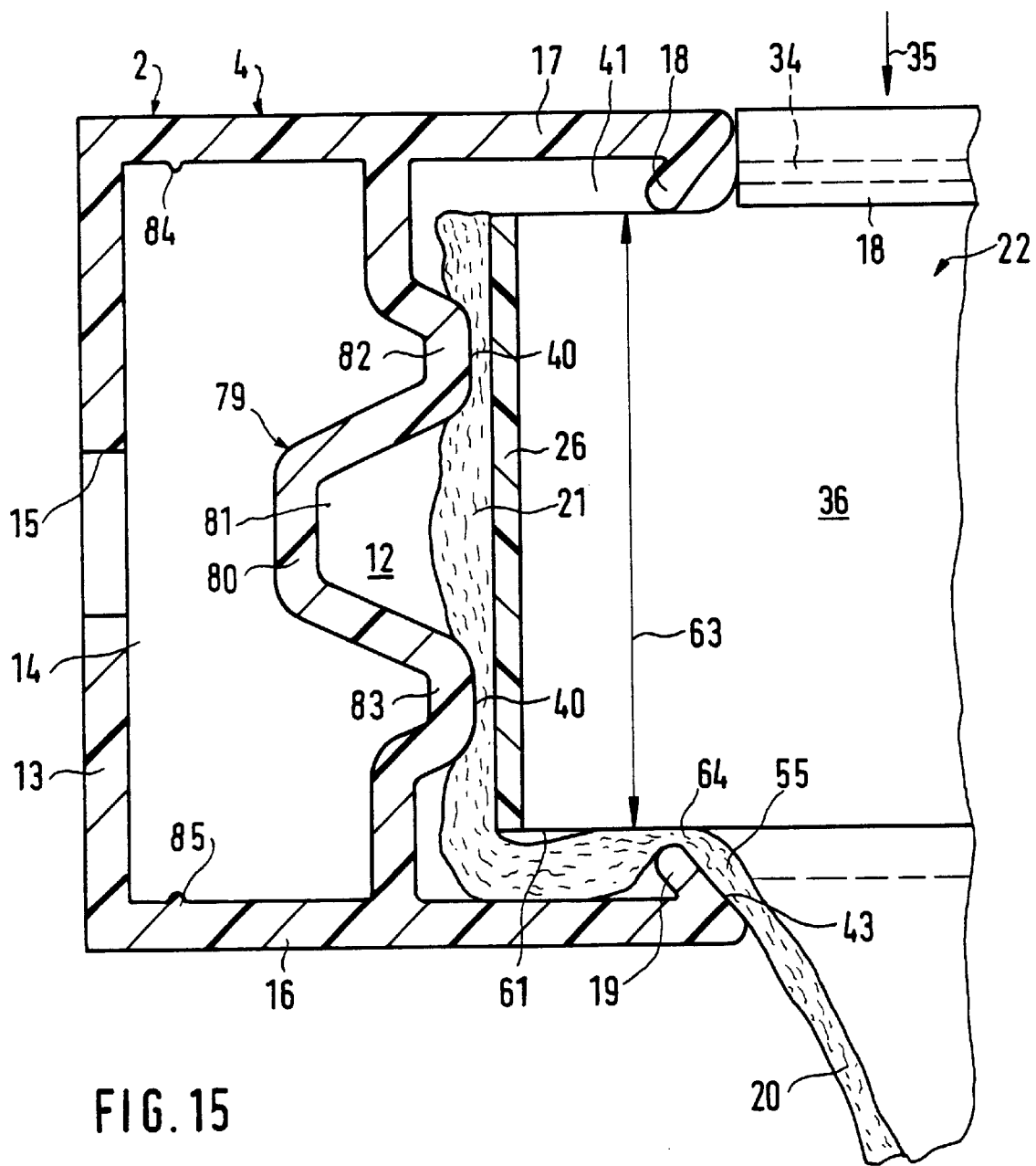
FIG. 15 shows a sectional view through the other embodiment corresponding to that of FIG. 3.

The same compression of the free border 21 occurs in accordance with FIG. 15 between the end profile 26 of the inner frame 22 and the opposing surfaces 40, 40.

In accordance with FIGS. 14 and 15, guide ribs 84, 85, extending parallel to the longitudinal axis of the profiles 6, 4 and guiding the corner connectors 8 with a limited surface and correspondingly low friction, project into the interior space of the profiles 6, 4.

FIGS. 16 to 19 represent another embodiment of the corner connector 8 in different views. Here each tongue 10 exhibits an essentially U-shaped cross section with a base 91 and with side walls 86 and 87 projecting inwards from the base 91. Moreover, a stiffening rib 88 extends from the base 91 of each tongue 10 in its longitudinal direction. Furthermore, gliding ribs 89 and 90, which may be supported on the base wall 13 of the profile 4 to 7, extend from each tongue 10 arranged at a distance from each other and parallel to a direction of introduction 92 of the tongue 10.

FIG. 18 shows that the base element 65 of the corner connector 8 exhibits lateral locating ribs 93 and 94 which are intended for positioning on the accompanying profile 4 to 7 and which project in the direction of the profile 4 to 7 which is not shown in FIG. 18. Between these locating ribs 93, 94, the base element 95 is therefore undercut so that location between the locating ribs 93, 94 and the opposing profile 4 to 7 will be achieved independently of the manufacturing tolerances of the corner connector 8.

Figure 20:
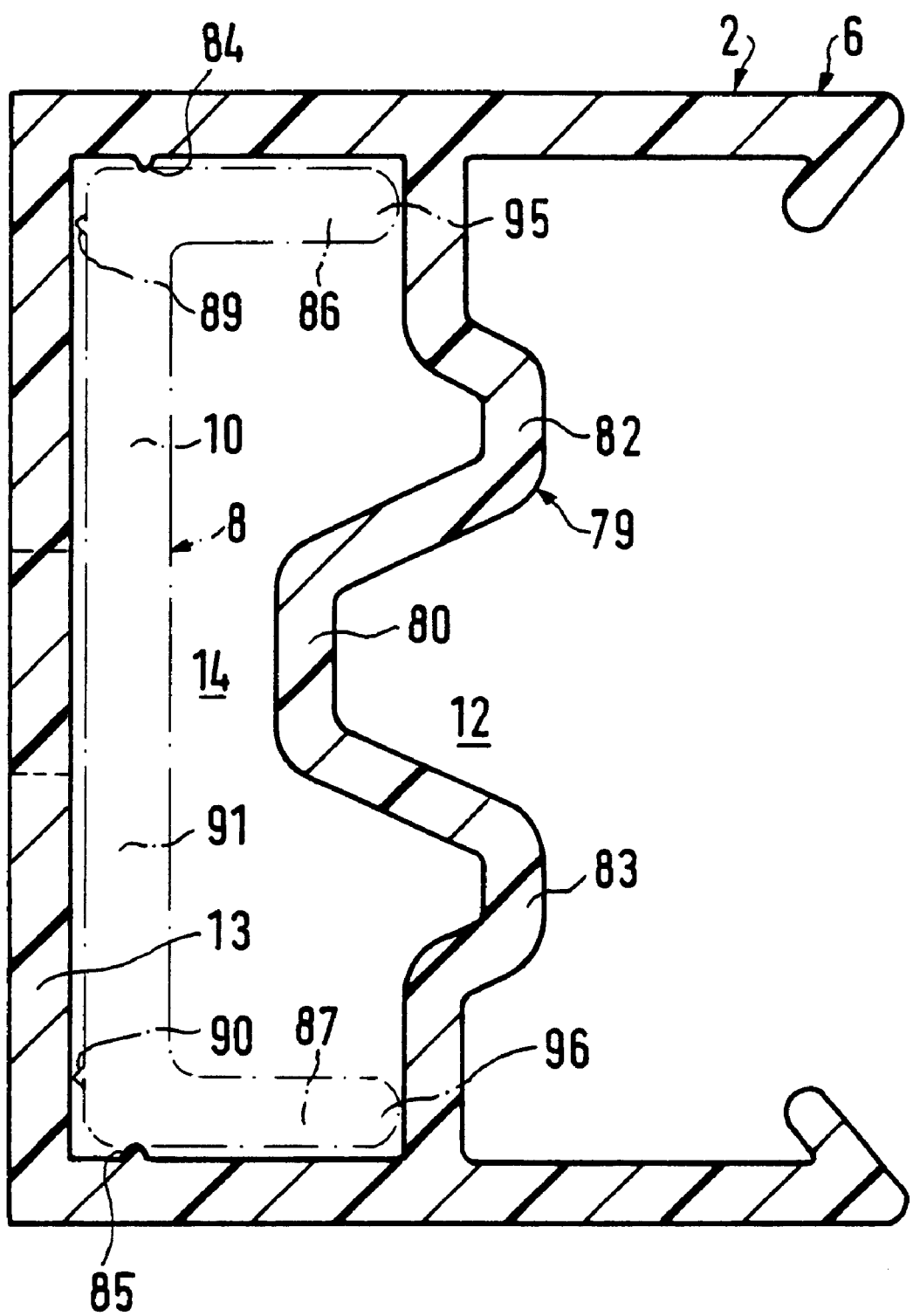

In accordance with FIG. 20, a chain-dotted line tongue 10 of the corner connector 8 is pushed into the longitudinal channel 14 of the base profile 6. Accordingly, the ends of the side walls 86, 87 attached to the base 91 are guided by the guide ribs 84, 85 and centered in the longitudinal channel 14. The gliding ribs 89, 90 are located in the extension of the side walls 86, 87, opposing their free ends 95 and 96. As shown in FIG. 20, when the tongue 10 is pushed in, the gliding ribs 89, 90 are supported on the base wall 13 and the free ends 95, 96 are supported on the intermediate wall 79. This can be arranged with a tight glide-fit in order to keep the tongue 10 generally tightly and securely guided in the longitudinal channel 14.

What is claimed is:

1. A pocket filter comprising:

an outer frame formed of a plurality of limb profiles interconnected with one another, said limb profiles including a pair of opposing limb profiles arranged opposite one another, a base profile, and a closing profile arranged opposite to said base profile, each of said limb profiles having a base wall and a pair of limbs extending transversely from said base wall in spaced relation to one another and defining a substantially U-shaped cross section with an open interior space between said limbs, each of said limbs having a free end and a holding rib extending from said free end into said interior space, said holding ribs on each said limb profile being spaced apart from each other at a predetermined distance;

a plurality of inner frames mounted side by side within said outer frame, each of said inner frames being formed by a pair of longitudinal profiles oppositely arranged in spaced relation and attached at each end by a pair of end profiles thereby defining an inlet between said longitudinal and end profiles, said inner frames each have a plurality of outer flanges positioned on said longitudinal profiles adjacent to said inlet and projecting outwardly therefrom, said flanges being separated from one another by a plurality of notches arranged between said flanges, said flanges and notches being arranged alternatingly in spaced relation along said longitudinal profile such that the flanges of one of said inner frames engages the notches on another of said inner frames when said inner frames are mounted side by side within said outer frame, a plurality of transverse walls being positioned transversely between said longitudinal profiles extending within said inlet, one longitudinal profile of said pair having a plurality of holes arranged in spaced relation lengthwise therealong, the other longitudinal profile of said pair having a plurality of projecting parts extending outwardly therefrom, said projecting parts being spaced lengthwise along said other longitudinal profile so as to interfit within said holes of said one longitudinal profile on another of said inner frames, each of said transverse walls being at least approximately aligned with a respective one of said holes and a respective one of said projecting parts; and a plurality of filter pockets, each having a side wall defining an interior and an opening at one end defined by a free border of said side wall, said free border of each said filter pocket surrounding a respective one of said inner frames for mounting said filter pocket thereon, said inlet providing access to said interior, said projecting parts on said inner frame penetrating said free border of said surrounding filter pocket and the free border of an adjacent filter pocket when each said projecting part interfits within one of said holes in an adjacent inner frame, the free border of each said filter pocket having at least one portion which extends into said interior space of one of said limb profiles and sealingly engages said limb profile.

2. A pocket filter according to claim 1, wherein at least one of said inner frames is formed in one piece.

3. A pocket filter according to claim 1, wherein at least one of said inner frames has first and second parts, each said part comprising one of said longitudinal profiles, a pair of end profiles, one said end profile being located at each end of said longitudinal profile, and a plurality of transverse walls located between said end profiles, said end profiles and transverse walls extending transversely from each of said longitudinal profiles, said end profiles and transverse walls on said first part being attached in overlapping engagement to corresponding ones of said transverse walls and said end profiles on the second of said parts.

4. A pocket filter according to claim 1, wherein, for each inner frame, each notch on one of said pair of longitudinal profiles comprising said inner frame is positioned substantially opposite to a flange on the other of said pair of longitudinal profiles comprising said inner frame.

5. A pocket filter according to claim 1, wherein said flanges have an under surface arranged facing said filter pocket, said under surface contacting said free border and providing a stop limiting motion of said filter pocket relatively to said inner frame.

6. A pocket filter according to claim 1, wherein said longitudinal profile of at least one of said inner frames has an outer longitudinal profile mounted lengthwise thereon, said outer longitudinal profile being engagable with one of said base and said closing profiles, said outer longitudinal profile having a height exceeding said predetermined distance between said holding ribs on said base and said closing profiles, said outer longitudinal profile being insertable between said holding ribs when said one inner frame engages one of said base and said closing profiles and causing said ribs thereon to deflect resiliently outwardly allowing said outer longitudinal profile to be received within said interior space of one of said base and said closing profiles, said ribs returning resiliently to an undeflected position when said outer longitudinal profile is received within said interior space.

7. A pocket filter according to claim 6, wherein each of said transverse walls on said one inner frame has a shoulder which faces toward said inlet, said shoulders engaging one of said holding ribs when said one inner frame engages one of said base and closing profiles to lock said inner frame into position within said outer frame.

8. A pocket filter according to claim 6, wherein said one inner frame has a longitudinal profile with a flange arranged lengthwise along a lower edge of said longitudinal profile, said flange projecting toward said inlet, a portion of said filter pocket being compressed between one of said holding ribs and said flange and guided through a serpentine path when said outer longitudinal profile is received within said interior space of one of said closing and said base profiles.

9. A pocket filter according to claim 7, wherein said one inner frame has a longitudinal profile with a flange arranged lengthwise along a lower edge of said longitudinal profile, said flange projecting toward said inlet, a portion of said filter pocket being compressed between one of said holding ribs and said flange and guided through a serpentine path when said outer longitudinal profile is received within said interior space of one of said closing and said base profiles.

10. A pocket filter according to claim 1, wherein said free border of at least one of said filter pockets is adhered to an outer surface of one of said inner frames.

11. A pocket filter according to claim 1, wherein for each said inner frame, each said end profile and at least a portion of each said longitudinal profile have a height relatively smaller than said predetermined distance between said holding ribs of said opposing limb profiles thereby allowing said end profiles and said portion of said longitudinal profiles to interfit within said interior space within said opposing limb profiles comprising said outer frame.

12. A pocket filter according to claim 6, wherein for each said inner frame, each said end profile and at least a portion of each said longitudinal profile have a height relatively smaller than said predetermined distance between said holding ribs of said opposing limb profiles thereby allowing said end profiles and said portion of said longitudinal profiles to interfit within said interior space within said opposing limb profiles comprising said outer frame.

13. A pocket filter according to claim 11, wherein a portion of said filter pocket is compressed between one of said holding ribs of said opposing limb profiles of said outer frame and a lower edge of said end profile of said inner frame, said portion of said filter pocket being guided through a serpentine path between said lower edge and said holding rib when said end profiles interfit within said interior space within said opposing limb profiles comprising said outer frame.

14. A pocket filter according to claim 13, wherein each of said filter pockets is adhered to said limbs and said holding ribs of said opposing limb profiles.

15. A pocket filter according to claim 1, wherein each said projecting part is dimensioned relatively larger than said hole receiving said projecting part so as to form an interference fit therebetween.

16. A pocket filter, comprising:
an outer frame formed of a plurality of limb profiles interconnected with one another, said limb profiles including a pair of opposing limb profiles arranged opposite one another, a base profile, and a closing profile arranged opposite to said base profile, each of said limb profiles having a base wall and a pair of limbs extending transversely from said base wall in spaced relation to one another and defining a substantially U-shaped cross section with an open interior space between said limbs, each of said limbs having a free end and a holding rib extending from said free end into said interior space, said holding ribs on each said limb profile being spaced apart from each other at a predetermined distance;
a plurality of inner frames mounted side by side within said outer frame, each of said inner frames being formed by a pair of longitudinal profiles oppositely arranged in spaced relation and attached at each end by a pair of end profiles thereby defining an inlet between said longitudinal and end profiles, each of said longitudinal profiles having a flange arranged lengthwise along a lower edge thereof, said flange projecting inwardly toward said inlet, a plurality of transverse walls being positioned transversely between said longitudinal profiles extending within said inlet, one longitudinal profile of said pair having a plurality of holes arranged in spaced relation lengthwise therealong, the other longitudinal profile of said pair having a plurality of projecting parts extending outwardly therefrom, said projecting parts being spaced lengthwise along said other longitudinal profile so as to interfit within said holes of said one longitudinal profile on another of said inner frames, each of said transverse walls being at least approximately aligned with a respective one of said holes and a respective one of said projecting parts; and a plurality of filter pockets, each having a side wall defining an interior and an opening at one end defined by a free border of said side wall, said free border of each said filter pocket surrounding a respective one of said inner frames for mounting said filter pocket thereon, said inlet providing access to said interior, said projecting parts on said inner frame penetrating said free border of said surrounding filter pocket and the free border of an adjacent filter pocket when each said projecting part interfits within one of said holes in an adjacent inner frame, the free border of each said filter pocket having at least one portion which extends into said interior space of one of said limb profiles and sealingly engages said limb profile.

17. A pocket filter according to claim 16, wherein said filter pocket is adhered to said flange, said limb and said holding rib of one of said base and said closing profiles when said outer longitudinal profile is received within said interior space of one of said closing and said base profiles.

18. A pocket filter, comprising:

an outer frame formed of a plurality of limb profiles interconnected with one another, said limb profiles including a pair of opposing limb profiles arranged opposite one another, a base profile, and a closing profile arranged opposite to said base profile, each of said limb profiles having a base wall and a pair of limbs extending transversely from said base wall in spaced relation to one another and defining a substantially U-shaped cross section with an open interior space between said limbs, each of said limbs having a free end and a holding rib extending from said free end into said interior space, each said holding rib being oriented at an acute angle relatively to the limb to which it is attached, said holding ribs on each said limb profile being spaced apart from each other at a predetermined distance;

a plurality of inner frames mounted side by side within said outer frame, each of said inner frames being formed by a pair of longitudinal profiles oppositely arranged in spaced relation and attached at each end by a pair of end profiles thereby defining an inlet between said longitudinal and end profiles, a plurality of transverse walls being positioned transversely between said longitudinal profiles extending within said inlet, one longitudinal profile of said pair having a plurality of holes arranged in spaced relation lengthwise therealong, the other longitudinal profile of said pair having a plurality of projecting parts extending outwardly therefrom, said projecting parts being spaced lengthwise along said other longitudinal profile so as to interfit within said holes of said one longitudinal profile on another of said inner frames, each of said transverse walls being at least approximately aligned with a respective one of said holes and a respective one of said projecting parts; and a plurality of filter pockets, each having a side wall defining an interior and an opening at one end defined by a free border of said side wall, said free border of each said filter pocket surrounding a respective one of said inner frames for mounting said filter pocket thereon, said inlet providing access to said interior, said projecting parts on said inner frame penetrating said free border of said surrounding filter pocket and the free border of an adjacent filter pocket when each said projecting part interfits within one of said holes in an adjacent inner frame, the free border of each said filter pocket having at least one portion which extends into said interior space of one of said limb profiles and sealingly engages said limb profile.

19. A pocket filter, comprising:

an outer frame formed of a plurality of limb profiles interconnected with one another, said limb profiles including a pair of opposing limb profiles arranged opposite one another, a base profile, and a closing profile arranged opposite to said base profile, each of said limb profiles having a base wall and a pair of limbs extending transversely from said base wall in spaced relation to one another and defining a substantially U-shaped cross section with an open interior space between said limbs, each of said limbs having a free end and a holding rib extending from said free end into said interior space, said holding ribs on each said limb profile being spaced apart from each other at a predetermined distance;

a plurality of inner frames mounted side by side within said outer frame, each of said inner frames being formed by a pair of longitudinal profiles oppositely arranged in spaced relation and attached at each end by a pair of end profiles thereby defining an inlet between said longitudinal and end profiles, a plurality of transverse walls being positioned transversely between said longitudinal profiles extending within said inlet, one longitudinal profile of said pair having a plurality of holes arranged in spaced relation lengthwise therealong, the other longitudinal profile of said pair having a plurality of projecting parts extending outwardly therefrom, said projecting parts being spaced lengthwise along said other longitudinal profile so as to interfit within said holes of said one longitudinal profile on another of said inner frames, each of said transverse walls being at least approximately aligned with a respective one of said holes and a respective one of said projecting parts; and a plurality of filter pockets, each having a side wall defining an interior and an opening at one end defined by a free border of said side wall, said free border of each said filter pocket surrounding a respective one of said inner frames for mounting said filter pocket thereon, said inlet providing access to said interior, said projecting parts on said inner frame penetrating said free border of said surrounding filter pocket and the free border of an adjacent filter pocket when each said projecting part interfits within one of said holes in an adjacent inner frame, the free border of each said filter pocket having at least one portion which extends into said interior space of one of said limb profiles and sealingly engages said limb profile, said limb profiles further comprise an opposing surface positioned within said interior space and facing away from said base wall, said opposing surface being positioned in spaced relation to said holding ribs by a predetermined separation distance so as to form an intermediate space between said holding ribs and said opposing surface, said intermediate space being adapted for receiving a portion of said free borders of said filter pockets when said inner frames are mounted within said outer frame.

20. A pocket filter according to claim 19, wherein for each said inner frame, each said end profile and at least a portion of each said longitudinal profile have a height relatively smaller than said predetermined distance between said holding ribs of said opposing limb profiles thereby allowing said end profiles and said portion of said longitudinal profiles to interfit within said intermediate space within said opposing limb profiles comprising said outer frame.

21. A pocket filter according to claim 20, wherein said free border of each said filter pocket is compressed by each of said end profiles of said inner frames against said opposing surface of said opposing limb profiles of said outer frame.

22. A pocket filter according to claim 19, wherein said free border of each said filter pocket is compressed by each of said end profiles of said inner frames against said opposing surface of said opposing limb profiles of said outer frame.

23. A pocket filter according to claim 21, wherein said free border of each said filter pocket is adhered to at least one of said opposing surfaces.

24. A pocket filter according to claim 19, wherein said pair of walls defining said longitudinal channel comprise said base wall and an intermediate wall located within said interior space and positioned in parallel, spaced relation to said base wall, said opposing surface being arranged in parallel, spaced relation to said intermediate wall, a support wall extending substantially perpendicularly between said intermediate wall and said opposing surface for supporting said opposing surface.

25. A pocket filter according to claim 24, further comprising first and second guide ribs arranged on opposite sides of said channel between said base wall and said intermediate wall and projecting into said interior space, said guide ribs engaging and guiding said tongues upon their insertion into said channel.

26. A pocket filter, comprising:
an outer frame formed of a plurality of limb profiles interconnected with one another, said limb profiles including a pair of opposing limb profiles arranged opposite one another, a base profile, and a closing profile arranged opposite to said base profile, each of said limb profiles having a base wall and a pair of limbs extending transversely from said base wall in spaced relation to one another and defining a substantially U-shaped cross section with an open interior space between said limbs, each of said limbs having a free end and a holding rib extending from said free end into said interior space, said holding ribs on each said limb profile being spaced apart from each other at a predetermined distance;
a corner connector body having a pair of tongues extending therefrom at right angles to one another, each of said tongues having a locking pin extending outwardly therefrom;
said limb profiles comprising said outer frame each having a longitudinal channel defined by a pair of walls arranged in spaced relation to one another within said interior space, said longitudinal channels being sized to receive one of said tongues, one of said walls having a locking aperture for receiving one of said locking pins, said tongues being inserted into said longitudinal channels with said locking pins engaging said locking apertures to connect said limb profiles together and form said outer frame;
a plurality of inner frames mounted side by side within said outer frame, each of said inner frames being formed by a pair of longitudinal profiles oppositely arranged in spaced relation and attached at each end by a pair of end profiles thereby defining an inlet between said longitudinal and end profiles, a plurality of transverse walls being positioned transversely between said longitudinal profiles extending within said inlet, one longitudinal profile of said pair having a plurality of holes arranged in spaced relation lengthwise therealong, the other longitudinal profile of said pair having a plurality of projecting parts extending outwardly therefrom, said projecting parts being spaced lengthwise along said other longitudinal profile so as to interfit within said holes of said one longitudinal profile on another of said inner frames, each of said transverse walls being at least approximately aligned with a respective one of said holes and a respective one of said projecting parts; and
a plurality of filter pockets, each having a side wall defining an interior and an opening at one end defined by a free border of said side wall, said free border of each said filter pocket surrounding a respective one of said inner frames for mounting said filter pocket thereon, said inlet providing access to said interior, said projecting parts on said inner frame penetrating said free border of said surrounding filter pocket and the free border of an adjacent filter pocket when each said projecting part interfits within one of said holes in an adjacent inner frame, the free border of each said filter pocket having at least one portion which extends into said interior space of one of said limb profiles and sealingly engages said limb profile.

27. A pocket filter according to claim 26, wherein each tongue is bifurcated by a slot extending parallel to the plane of said tongue and lengthwise along said tongue from an end of said tongue distal to said corner connector body to a point on said tongue between said connector body and said locking pin.

28. A pocket filter according to claim 26, wherein each tongue has a pair of slots, one of said slots being positioned on each side of said locking pin and extending lengthwise along said tongue from an end of said tongue distal to said corner connector body to a point on said tongue between said connector body and said locking pin.

29. A pocket filter according to claim 26, wherein the height of each locking pin above said tongue is relatively greater on a region of said locking pin proximate to said connecting body than a region of said locking pin distal to said connecting body.

30. A pocket filter according to claim 26, wherein said pair of walls defining said longitudinal channel comprise said base wall and an intermediate wall located within said interior space and positioned in parallel, spaced relation to said base wall, said intermediate wall having a corrugated cross section with at least one trough flanked by a pair of crests, said trough being positioned so as to form a notch for receiving said projecting parts, said crests defining a pair of opposing surfaces positioned within said interior space and facing away from said intermediate wall, said opposing surfaces being positioned in spaced relation to holding ribs by a predetermined separation distance so as to form an intermediate space between said holding ribs and said opposing surfaces, said intermediate space for receiving a portion of said free border of said filter pocket when said inner frames are mounted within said outer frame.

31. A pocket filter according to claim 26, further comprising first and second guide ribs arranged on opposite sides of said channel and projecting into said interior space, said guide ribs engaging and guiding said tongues upon insertion into said channel.

32. A pocket filter according to claim 30, further comprising first and second guide ribs arranged on opposite sides of said channel and projecting into said interior space, said guide ribs engaging and guiding said tongues upon their insertion into said channel.

33. A pocket filter according to claim 26, wherein each said tongue comprises a planar base portion and a pair of side walls extending substantially perpendicularly from the plane of said base portion in a substantially parallel spaced apart relation to form a U-shaped cross section of said tongue.

34. A pocket filter according to claim 33, further comprising a stiffening rib arranged lengthwise along said tongue.

35. A pocket filter according to claim 26, further comprising a pair of gliding ribs arranged lengthwise along each of said tongues and positioned on a side thereof so as to engage said base wall when said tongues are received within said channels.

36. A pocket filter according to claim 26, wherein said connector body comprises a base element having a surface on which said tongues are mounted.

* * * * *

UNITED STATES PATENT AND TRADEMARK OFFICE
CERTIFICATE OF CORRECTION

PATENT NO. : 6,451,079 B1
DATED : September 17, 2002
INVENTOR(S) : Lange et al.

It is certified that error appears in the above-identified patent and that said Letters Patent is hereby corrected as shown below:

<u>Column 18,</u>
Line 1, after "profiles" insert -- thereby defining an inlet between said longitudinal and end profiles --

Signed and Sealed this

Eleventh Day of February, 2003

JAMES E. ROGAN
*Director of the United States Patent and Trademark Office*